(12) United States Patent
Kris et al.

(10) Patent No.: US 8,779,734 B2
(45) Date of Patent: Jul. 15, 2014

(54) INTEGRATED CIRCUIT DEVICE WITH TWO VOLTAGE REGULATORS

(75) Inventors: Bryan Kris, Gilbert, AZ (US); Joseph W. Triece, Phoenix, AZ (US); J. Clark Rogers, Phoenix, AZ (US); Pieter Schieke, Phoenix, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 274 days.

(21) Appl. No.: 13/313,296

(22) Filed: Dec. 7, 2011

(65) Prior Publication Data

US 2013/0147446 A1    Jun. 13, 2013

(51) Int. Cl.
 *H02M 3/158* (2006.01)
 *G05F 1/59* (2006.01)

(52) U.S. Cl.
 USPC .......................................... 323/269; 323/271

(58) Field of Classification Search
 USPC ................... 323/268, 269, 271, 272; 363/147
 See application file for complete search history.

(56) References Cited

U.S. PATENT DOCUMENTS

| | | | |
|---|---|---|---|
| 6,661,211 B1* | 12/2003 | Currelly et al. | 323/268 |
| 2002/0041178 A1 | 4/2002 | Hiraki et al. | 323/272 |
| 2004/0174148 A1* | 9/2004 | Hiraki et al. | 323/268 |
| 2005/0064830 A1 | 3/2005 | Grigore | 455/127.4 |
| 2006/0001409 A1* | 1/2006 | Hachiya | 323/282 |

FOREIGN PATENT DOCUMENTS

WO     01/27728 A1    4/2001    ............... G06F 1/32

OTHER PUBLICATIONS

International Search Report and Written Opinion, Application No. PCT/US2012/067944, 24 pages, Dec. 16, 2013.

* cited by examiner

*Primary Examiner* — Harry Behm
*Assistant Examiner* — Matthew Grubb
(74) *Attorney, Agent, or Firm* — King & Spalding L.L.P.

(57) ABSTRACT

An integrated circuit device has a digital device operating at an internal core voltage; a linear voltage regulator; and an internal switched mode voltage regulator controlled by the digital device and receiving an external supply voltage being higher than the internal core voltage through at least first and second external pins and generating the internal core voltage, wherein the internal switched mode voltage regulator is coupled with at least one external component through at least one further external pin of the plurality of external pins.

33 Claims, 8 Drawing Sheets

INTEGRATED CIRCUIT DEVICE WITH TWO VOLTAGE REGULATORS

TECHNICAL FIELD

The technical field of the present application relates to integrated circuit devices, in particular a microprocessor or microcontroller, with two voltage regulators.

BACKGROUND

Integrated circuit devices with a high integration factor are manufactured using specific processing technology. Such devices are more and more occupying less space due to improved process technology. With decreasing process geometry, the operating voltage or core voltage in such devices is also reduced. While it was common to use a supply voltage of e.g. 5 Volts, newer devices use only 3.3 Volts or even less. At 0.18 µm process technology, the internal core voltage is 1.8 Volts. Other technologies may reduce the voltage even further, for example to 1.2 Volts. While circuit boards are often designed using 3.3V or 5V as the supply voltage, many integrated devices generate the internal core voltage of, for example 1.8 volts or even lower core voltages by means of an integrated voltage regulator. Such voltage regulators are traditionally linear regulators. Thus, an input power loss which is converted into heat by the linear voltage regulator of up to 45% ((3.3V−1.8V)/3.3V=45%) can occur. This waste of energy can moreover be significant in any battery operated device.

Hence, there exists a need for an improved integrated circuit device.

SUMMARY

According to an embodiment, an integrated circuit device may comprise: a digital device operating at an internal core voltage; a linear voltage regulator; and an internal switched mode voltage regulator controlled by the digital device and receiving an external supply voltage being higher than the internal core voltage through at least first and second external pins and generating the internal core voltage, wherein the internal switched mode voltage regulator is coupled with at least one external component through at least one further external pin of the plurality of external pins.

According to a further embodiment, the external component may comprise an inductor. According to a further embodiment, the external component may comprise an inductor and a capacitor, wherein the inductor is coupled between a third and fourth external pin and the capacitor is coupled between the fourth external pin and ground. According to a further embodiment, the internal switched mode voltage regulator can be a buck regulator. According to a further embodiment, the digital device can be a microcontroller. According to a further embodiment, the microcontroller may comprise a low power function. According to a further embodiment, the digital device can be selected from the group consisting of: a microprocessor, a state machine, an application specific integrated circuit (ASIC), and a logic device. According to a further embodiment, an output of the switched mode voltage regulator and the linear voltage regulator can be connected. According to a further embodiment, the switched mode voltage regulator may generate a higher output voltage than the linear voltage regulator. According to a further embodiment, the integrated circuit device may further comprise a comparator that automatically turns off the linear voltage regulator once the higher output voltage has been detected. According to a further embodiment, the comparator can be a set point comparator of the linear voltage regulator. According to a further embodiment, the linear voltage regulator can be the default voltage regulator and further comprising a configuration register for activating the switched mode voltage regulator. According to a further embodiment, the integrated circuit device may further comprise a power management unit operable to enable or disable at least one of the buck regulator and the linear voltage regulator. According to a further embodiment, the external supply voltage can be about 3.3 Volts and the internal core voltage is about 1.8 Volts. According to a further embodiment, the at least one further external pin can be multiplexed with other microcontroller functions.

According to another embodiment, a circuit board may comprise the integrated circuit device as described above and a plurality of further integrated circuit devices operating at the external supply voltage, wherein the circuit board provides the external supply voltage as the only power supply voltage to the integrated circuit.

According to yet another embodiment, a method of operating an integrated circuit device may comprise: providing a supply voltage; providing an integrated circuit device operating at an internal core voltage being lower than the external supply voltage; feeding the supply voltage to the integrated circuit; generating the internal core voltage within the integrated circuit device by means of a linear voltage regulator; programming a switched mode voltage regulator within the integrated circuit device to operate, wherein the switched mode voltage regulator being connected to at least one external component via at least one external connection pin; switching from the linear voltage regulator to the switched mode voltage regulator for generating the internal core voltage.

According to a further embodiment of the method, the switched mode voltage regulator may generate a higher output voltage than the linear voltage regulator and the step of switching comprises comparing the output voltage of the switched mode voltage regulator with a reference value. According to a further embodiment of the method, the step of comparing can be performed by a set point comparator of the linear voltage regulator. According to a further embodiment of the method, the linear voltage regulator can be the default voltage regulator and the step of programming comprises writing a configuration value into a configuration register or a control value into a control register. According to a further embodiment of the method, the method may further comprise enabling or disabling at least one of the buck regulator and the linear voltage regulator. According to a further embodiment of the method, the integrated circuit device can be a microcontroller. According to a further embodiment of the method, the method may further comprise multiplexing the at least one further external pin with other microcontroller functions. According to a further embodiment of the method, the method may further comprise switching back to the linear voltage regulator for generating the internal core voltage and turning off the switched mode voltage regulator; performing a function of the integrated circuit device; after performing the function switching back from the linear voltage regulator to the switched mode voltage regulator. According to a further embodiment of the method, the integrated circuit device can be a microcontroller and the function is an analog-to-digital conversion function. According to a further embodiment of the method, the integrated circuit device can be a microcontroller and the function is a low power mode function.

According to yet another embodiment, a method of operating an integrated circuit device may comprise: providing a supply voltage; providing an integrated circuit device operating at an internal core voltage being lower than the external supply voltage; feeding the supply voltage to the integrated circuit; selecting the internal core voltage from either a linear voltage regulator or a switched mode voltage regulator according to a preset configuration, wherein the switched mode voltage regulator being connected to at least one external component via at least one external connection pin; generating the internal core voltage within the integrated circuit device by means of the selected voltage regulator.

According to a further embodiment of the above method, the method may further comprise switching from the linear voltage regulator to the switched mode voltage regulator or vice versa for generating the internal core voltage. According to a further embodiment of the above method, the switching can be performed by setting or clearing at least one bit in a control register. According to a further embodiment of the above method, the switched mode voltage regulator may generate a higher output voltage than the linear voltage regulator and the step of switching comprises comparing the output voltage of the switched mode voltage regulator with a reference value. According to a further embodiment of the method, the step of comparing can be performed by a set point comparator of the linear voltage regulator. According to a further embodiment of the method, the method may further comprise enabling or disabling at least one of the buck regulator and the linear voltage regulator. According to a further embodiment of the method, the method may further comprise the integrated circuit device can be a microcontroller. According to a further embodiment of the method, the method may further comprise multiplexing the at least one further external pin with other microcontroller functions. According to a further embodiment of the method, the method may further comprise switching to the linear voltage regulator for generating the internal core voltage and turning off the switched mode voltage regulator; performing a function of the integrated circuit device; after performing the function switching back from the linear voltage regulator to the switched mode voltage regulator. According to a further embodiment of the method, the integrated circuit device can be a microcontroller and the function is an analog-to-digital conversion function. According to a further embodiment of the method, the integrated circuit device can be a microcontroller and the function is a low power mode function.

Other technical advantages of the present disclosure will be readily apparent to one skilled in the art from the following figures, descriptions, and claims. Various embodiments of the present application may obtain only a subset of the advantages set forth. No one advantage is critical to the embodiments.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION

In particular, battery powered integrated circuit devices, such as microcontroller (MCU) applications need to minimize power consumption. While external voltage regulators could be provided, such a solution is often not acceptable in terms of space and cost requirements. Moreover, devices that use such a low internal core voltage may only be available with an integrated linear voltage regulator which can cause a reduced battery life. Thus, a more efficient external regulator may be of no use.

An integrated circuit device, for example but not limited to a microprocessor or microcontroller, can be provided with a switched mode power regulator such as an internal buck regulator. Such a switched voltage regulator can be designed to be very efficient. The internal switched mode voltage regulator can be designed to only require a minimum of external components such as an inductor and large capacitor. All other components such as power transistors and control circuitry can be integrated wherein certain peripheral functions may be combined with the internal regulator to further save real estate on the silicon die.

Figure 1:
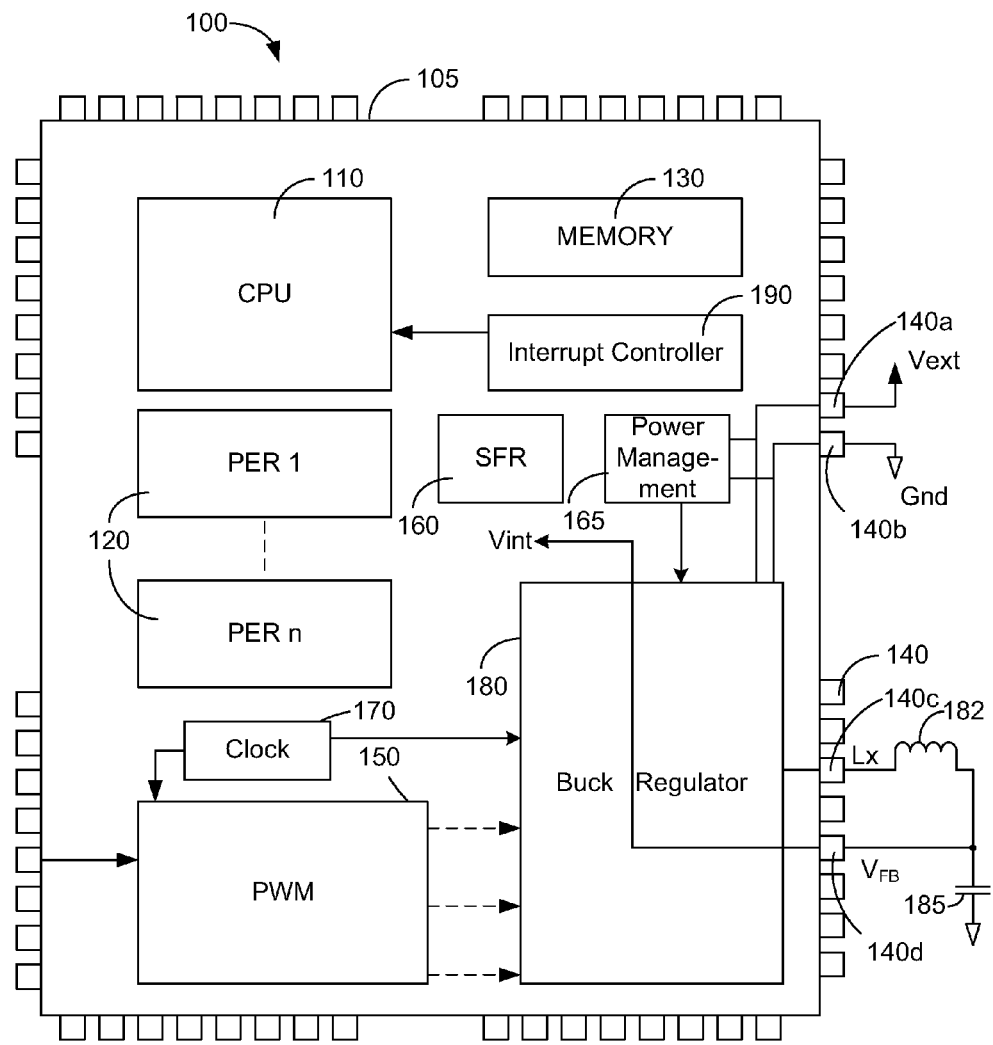
FIG. 1 is a block diagram showing a microcontroller according to an embodiment.

FIG. 1 shows a block diagram of a microcontroller 100. FIG. 1 shows only certain connections between components for sake of a better overview. Each connection can represent a single or multiple connection lines depending on the respective functionality. Some connections may be alternatives and may not be needed as will be appreciated by a person skilled in the art.

An integrated chip 100 is embedded in a housing 105 having a plurality of external pins 140. As typical for microcontrollers, the integrated chip 100 comprises a central processing unit 110, a plurality of peripheral devices 120 and memory 130. One of these peripheral devices can be a pulse width modulation module 150. Furthermore, the microcontroller comprises an integrated switched mode voltage regulator 180, for example a buck regulator. The buck regulator uses certain peripheral functions as for example provided by the pulse width modulation module 150. However, the switched mode voltage regulator 180 may not require resources from the microcontroller. In such a case, all peripheral functions are available to a user. The microcontroller may comprise an internal system and/or peripheral bus. Further functional units or modules are shown in FIG. 1, for example, an interrupt controller 190, a clock system 170 that may supply one or more clock signals to the pulse width modulation module 150 and to the switched mode voltage regulator 180. A power management module 165 may be provided which can control certain function, in particular when the system switches into a low power mode to further reduce power consumption of the device. The power management module may operate with the external supply voltage provided through external pins 140a and 140b. Thus, the power management module may be configured to shut down all other components of the microcontroller with the exception of itself, wherein the power management unit may require only a very small supply current in Sleep mode. To this end, switched mode power regulator 180 may be operable to be switched on and off by means of the power management module 165.

The buck regulator 180 is connected with the external supply voltage Vext and with Ground through external pins 140a and 140b. As mentioned above, the buck regulator can be designed to only require a minimum of external components. In FIG. 1, only a single inductor 182 and capacitor 185 are required externally. These components 182, 185 are connected with the integrated buck regulator 180 via two additional external pins 140c and 140d. To this end, the inductor 182 is coupled between the first additional external pins 140c and 140d wherein the capacitor is connected between the second additional external pin 140d and ground. The buck regulator 180 generates the lower core voltage and supplies it internally to the various microcontroller structures that operate at this voltage as indicated with the internal voltage output $V_{int}$. However, as the core voltage $V_{int}$ is also available at the external connection $V_{FB}$, other components on a circuit board may be connected to this pin.

Figure 2:
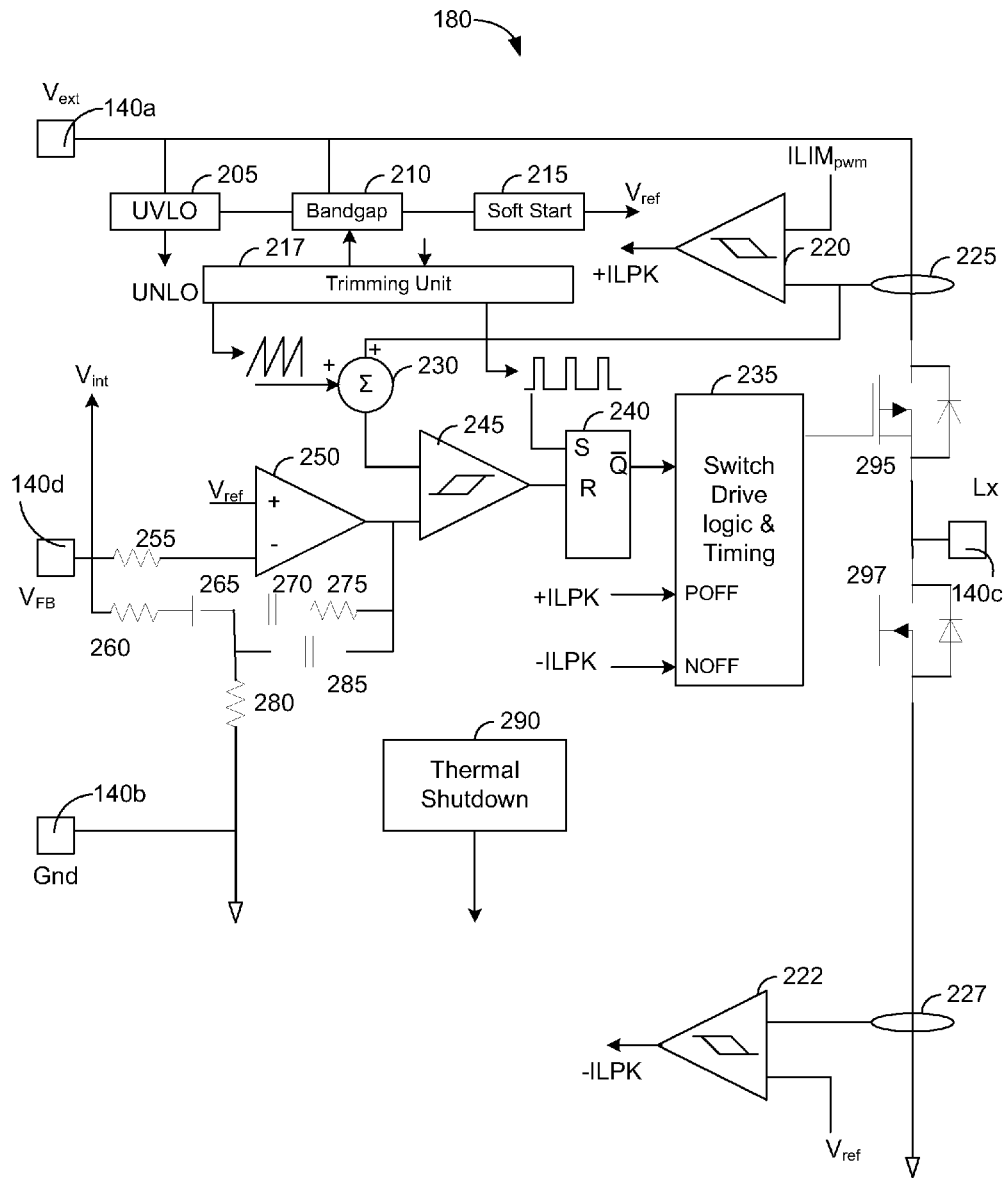
FIG. 2 shows an embodiment of an exemplary buck regulator that can be integrated with a microcontroller.

FIG. 2 shows a more detailed circuit diagram of a possible implementation of a buck regulator within a microcontroller. However, other designs may be used within a microcontroller. The buck regulator shown in FIG. 2 comprises a under voltage lock out unit 205 and a bandgap reference 210, each connected with the external supply voltage through external pin 140a. A soft start unit 215 is coupled with the output of the bandgap reference 210 and provides for the reference voltage Vref. a first operational amplifier 250 receives the reference voltage Vref at its non-inverting input and the feedback signal at its inverting input. the feedback signal is obtained through external pin 140d and a filter network consisting of resistors 255, 260, 275, and 280 and capacitors 265, 270 and 285 which are coupled between the feedback pin 140d and the output of comparator 250. The output of operational amplifier 250 is coupled with the input of a first comparator 245 whose output controls the R-input of Flip-flop 240. The S-input of flip-flop 240 receives a pulse signal. The output of flip-flop 240 drives a switch drive logic & and timing module 235 which controls the power MOSFETs 295 and 297. A second comparator compares the input current into MOSFET 295 measured by sensor 225 with a reference value ILIMpwm and generates a control signal +ILPK fed to the module 235. Similarly, a third comparator 222 compares the output current from MOSFET 297 through sensor 227 with a reference value Vref and generates a control signal −ILPK fed to the module 235. A summation point 230 receives the input current measurement signal from sensor 225 and a reference saw tooth signal. The output of summation point 230 is fed to the first comparator. The buck regulator may furthermore comprise a thermal shutdown module 290. In addition, a trimming unit 217 may be provided for certain units of the buck regulator 180. Alternatively certain units or functions of the buck regulator may be configured to be trimmed by a control unit such as the microcontroller, for example through one or more special function registers 160, or by means of at least one or more fuses etc. Also a special function register 160 used for trimming may be advantageously a configuration register that is non-volatile. The special function register 160 in particular a non-volatile configuration register may be used to control other functions and parameters of the buck regulator, such as output voltage, output current, parameters of the bandgap, over or under-voltage protection, etc.

The buck controller 180 shown in FIG. 2 is a synchronous buck controller that operates in a Pulse Frequency Modulation (PFM) mode or a Pulse Width Modulation (PWM) mode to maximize system efficiency over the entire operating current range. However, other switched mode voltage regulators may be used as mentioned above. Capable of operating from, for example, a 2.7V to 5.5V input voltage source, the buck regulator 180 can for example deliver 500 mA of continuous output current. While in PWM mode, the device switches at a constant frequency of for example 2.0 MHz which allow for small filtering components. A variety of fixed voltage can be provided, for example, 1.2V, 1.5V 1.8V, 2.5V, 3.3,). Additionally the device features under-voltage lockout (UVLO) by unit 205, over-temperature shutdown by unit 290, over-current protection, and enable/disable control which may be controlled by the power management module 165.

Buck regulator 180 has two distinct modes of operation that allow the device to maintain a high level of efficiency throughout the entire operating current and voltage range. The device automatically switched between PWM mode and PFM mode depending upon the output load requirements. During heavy load conditions, the buck regulator 180 operates at a high, fixed switching frequency of for example 2.0 MHz (typical) using current mode control. This minimizes output ripple (10-15 mV typically) and noise while maintaining high efficiency (88% typical with VIN=3.6V, VOUT=1.8V, IOUT=300 mA). During normal PWM operation, the beginning of a switching cycle occurs when the internal P-Channel MOSFET 295 is turned on. The ramping inductor current is sensed and tied to one input of the internal high-speed comparator 245. The other input to the high-speed comparator is the error amplifier output. This is the difference between the internal 0.8V reference and the divided down output voltage. When the sensed current becomes equal to the amplified error signal, the high speed comparator 245 switches states and the P-Channel MOSFET 295 is turned off. The N-Channel MOSFET 297 is turned on until the internal oscillator sets an internal RS latch initiating the beginning of another switching cycle. PFM-to-PWM mode transition is initiated for any of the following conditions: Continuous device switching and Output voltage has dropped out of regulation.

During light load conditions, buck regulator 180 operates in a PFM mode. When buck regulator 180 enters this mode, it begins to skip pulses to minimize unnecessary quiescent current draw by reducing the number of switching cycles per second. The typical quiescent current draw for this device is for example 45 µA. PWM-to-PFM mode transition is initiated for any of the following conditions: Discontinuous inductor current is sensed for a set, duration and Inductor peak current falls below the transition threshold limit. The output of buck regulator 180 is controlled during startup. This control allows for a very minimal amount of VOUT overshoot during start-up from VIN rising above the UVLO voltage or SHDN being enabled.

Over-temperature protection circuitry 290 is integrated in the buck regulator 180. This circuitry monitors the device junction temperature and shuts the device off, if the junction temperature exceeds the typical 150° C. threshold. If this threshold is exceeded, the device will automatically restart once the junction temperature drops by approximately 10° C. The soft start unit 215 is reset during an over-temperature condition.

Cycle-by-cycle current limiting is used to protect the buck regulator 180 from being damaged when an external short circuit is applied. The typical peak current limit is for example 860 mA. If the sensed current reaches the 860 mA limit, the P-Channel MOSFET 295 is turned off, even if the output voltage is not in regulation. The device will attempt to start a new switching cycle when the internal oscillator sets the internal RS latch.

The UVLO feature uses a comparator to sense the input voltage (VIN) level. If the input voltage is lower than the voltage necessary to properly operate the buck regulator 180, the UVLO feature will hold the converter off. When VIN rises above the necessary input voltage, the UVLO is released and soft start begins. Hysteresis is built into the UVLO circuit to compensate for input impedance. For example, if there is any resistance between the input voltage source and the device when it is operating, there will be a voltage drop at the input to the device equal to IIN×RIN. The typical hysteresis is 140 mV.

Figure 3:
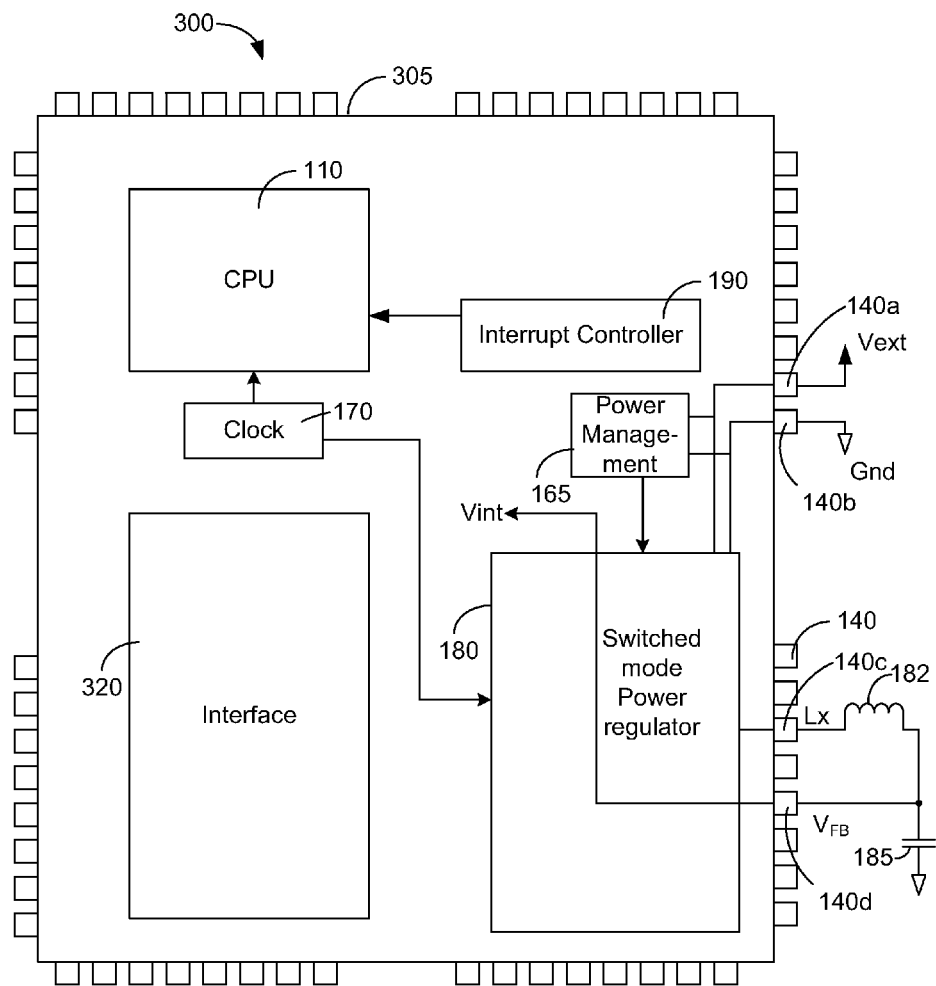
FIG. 3 shows another embodiment of a microprocessor.

FIG. 3 shows a similar device in form of a microprocessor. Similar elements carry the same reference sign. Here, instead of a plurality of peripheral devices, only an interface module 320 to connect the device to external peripheral devices and memory may be provided. The processor 300 again has a housing 305 which contains all the essential components of a microprocessor. The device may also comprise cache memory. The switched mode Power regulator 180 may again be a buck regulator as shown in FIG. 2 and discussed above.

Figure 4:
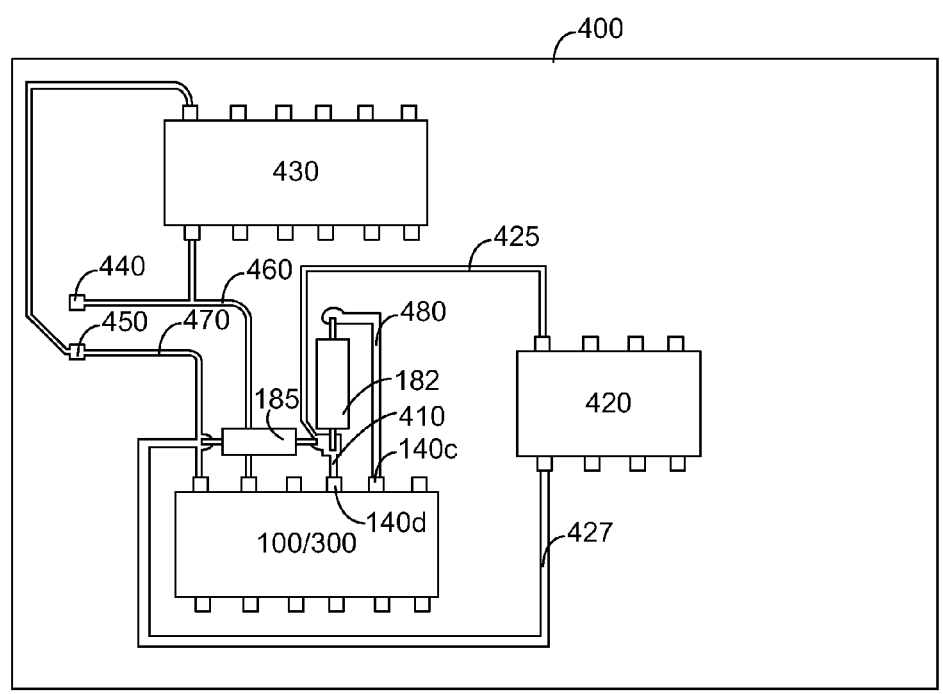
FIG. 4 shows an application of a microprocessor or microcontroller as shown in FIGS. 1 and 3 with other components on a circuit board.

FIG. 4 shows a printed circuit board comprising an integrated circuit device 100 or 300 as shown in FIGS. 1 and 3. The printed circuit board comprises a plurality of conductive paths or track 410, 425, 426, 460, 470, 480 and connection pads 440 and 450. Furthermore additional components 182, 185, 420 and 430 are shown. Of course the circuit board 400 may comprise more or less components and additional circuit tracks. An external supply voltage generated by an external power supply is fed to the connection pads 440 and 450 such that ground is connected to pad 450 and for example 3.3 Volts to pad 440. Tracks 460 and 470 connect the power supply with the power supply pins 140a, b of integrated circuit device 100/300. The buck converter formed by internal components of integrated circuit device 100/300 and external components 182, 185 generates the internal core voltage of 1.8 Volts. To this end, circuit board 400 provides for conductive tracks 410 and 480 to properly connect the inductor 182 and capacitor 185 with the external pins 140c and 140d of integrated circuit device 100/300. The circuit board may comprise a plurality of other components which operate at the higher supply voltage of 3.3 Volts. FIG. 4 shows one such component with reference symbol 430. However, a plurality of such components may be present. Component 430 is therefore directly connected to pads 440 and 450 through extensions of circuit tracks 460 and 470, respectively. In addition, the circuit board may comprise components that operate at the lower core voltage of 1.8 Volts. FIG. 4 shows such a component with reference sign 420. In case such a component does not have its own voltage regulator, the device can be connected to ground pad 450 and external pin 140d of integrated circuit device 100/300 as external pin 140d which receives the feedback signal $V_{FB}$ carries the regulated core voltage of for example 1.8 Volts. other components that operate with this voltage can also be connected to this pin 140d.

Depending on the situation, a switched mode voltage regulator may not always be beneficial in an integrated circuit device. For example, a buck regulator may generate unwanted switching noise, may have a limited low voltage operation and may have issues with low power modes of operation such as a Sleep mode or a Deep Sleep mode where the buck regulator may not function well. A switched mode voltage regulator may also have a higher quiescent current compared to a linear voltage regulator. Thus, according to various embodiments, integrated circuit devices with a combination of linear voltage regulator and a switched mode voltage regulator are disclosed. In the following the integrated circuit device comprises a microcontroller. However, the present application is not limited to microcontrollers. Other digital devices capable of controlling the switched mode voltage regulator, such as but not limited to a microprocessor, a state machine, an application specific integrated circuit (ASIC), or a logic device such as an FPGA can be used. Moreover, the following embodiments show a buck regulator as the switched mode voltage regulator. However, while such an application is particularly beneficial other switched mode voltage regulators may be substituted for the buck regulator.

Figure 5:
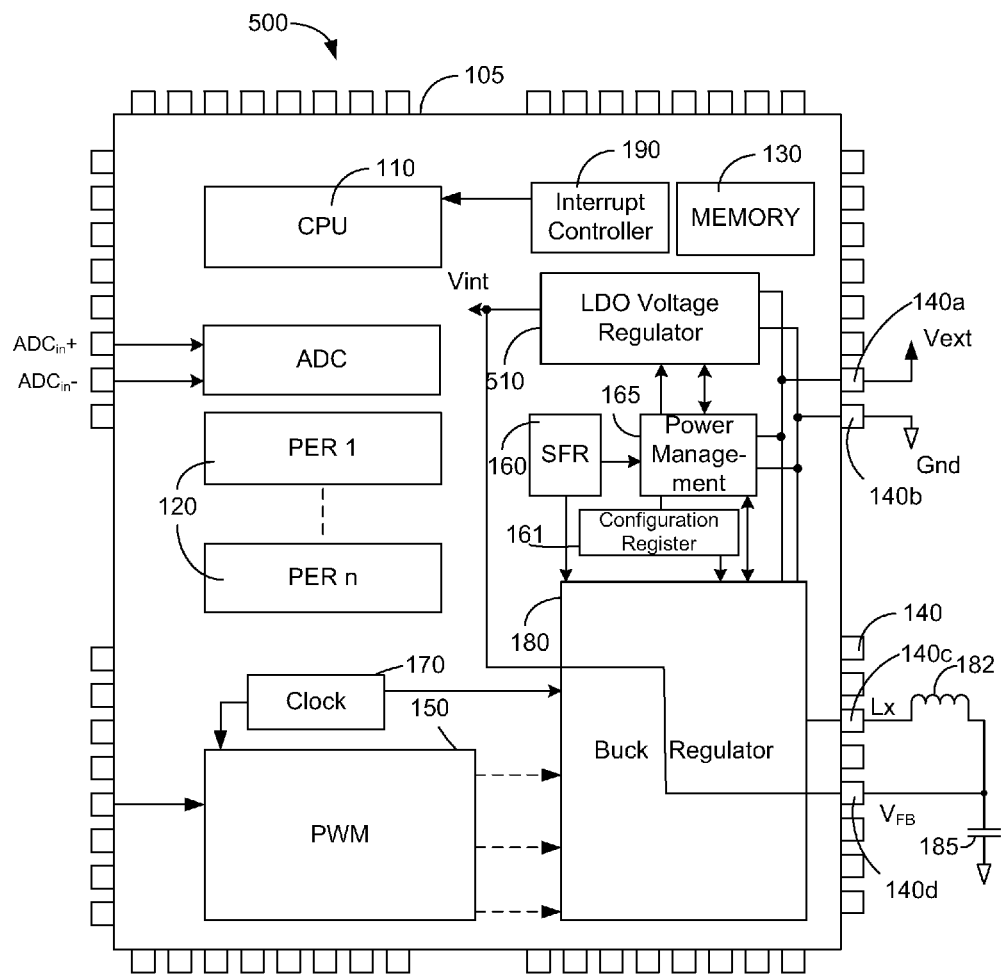
FIG. 5 shows another embodiment of a microcontroller with integrated switched mode voltage regulator.

FIG. 5 shows one embodiment of a microcontroller or microprocessor 500 with an integrated switched mode power regulator, for example a buck regulator. However, here the microcontroller 500 also comprises a low dropout (LDO) voltage regulator 510 as typically applied in many integrated circuits and discussed above. The internal core voltage can now either be generated by the LDO voltage regulator 510 or by the buck regulator 180 depending on the application or operation mode. Thus, a user can dynamically switch between the two type of regulators. To this end, one or more dedicated special function register 160 may be provided to select which voltage regulator is used.

According to certain embodiments, a power management unit 165 can be used to select between the two regulators wherein the power management unit 165 enables or disables the respective regulator. This is advantageous, in particular when the buck regulator is chosen because shutting down the LDO voltage regulator 510 by means of the power management unit 165 avoids any unwanted additional power consumption. Moreover, as shown in FIG. 5, at start up, both regulators 180 and 510 are connected with the external supply voltage through pins 140a and 140b. By default, the LDO voltage regulator can be enabled and provides the internal core voltage initially whereas the buck regulator may be initially disabled or start up in parallel. In case the an application wants to use the buck regulator, a switch over between the two regulators automatically or by programming a special function register 160. According to an embodiment, power management unit 165 can handle the transition once a stable internal supply voltage is generated by the buck regulator 180 and turn off the internal LDO voltage regulator. This arrangement can be beneficial if the start up time for the buck regulator 180 is significantly longer than that of the LDO voltage regulator. This start-up sequence can also be used during a Sleep mode in which either both regulators are shut down or only the buck regulator is turned off. This can provide for a fast recovery from Sleep mode while only using the LDO Voltage regulator 510 in the transition period until the buck regulator 180 is fully operational. The microcontroller CPU can be operational faster and may not have to wait for a stable operating buck regulator.

A low power mode such as, for example, a Sleep or Deep Sleep mode, may require a voltage that is lower than a minimum buck regulator output voltage. Thus, the buck regulator may not be operational in such a mode. Thus, whenever such a mode is entered, the system may automatically configure the linear voltage regulator for the specific low output voltage and switch off the buck regulator. The, the system can safely turn into the specific low power mode.

Figure 6:
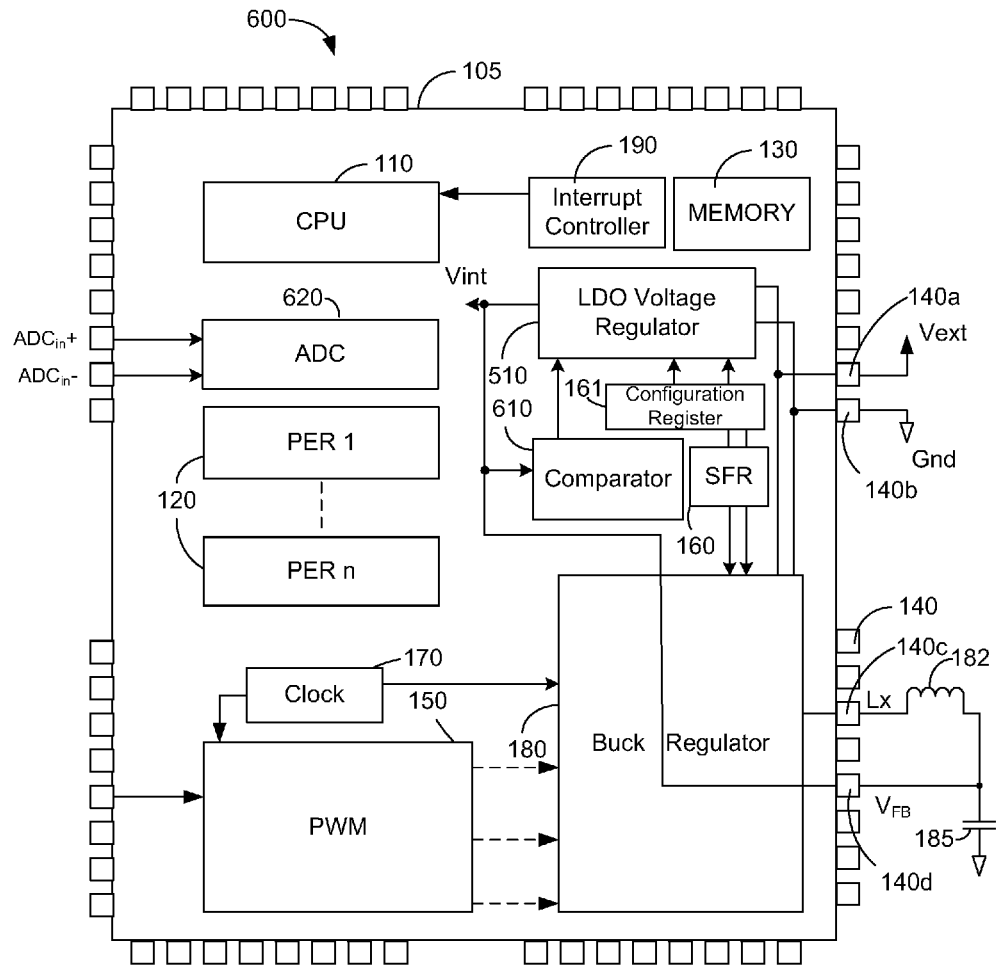
FIG. 6 shows yet another embodiment of a microcontroller with integrated switched mode voltage regulator.

A user may also decide that in certain applications, the noise produced by the buck regulator 180 is not acceptable. For example, using an analog-to digital converter integrated within the microcontroller or external to the microcontroller may require in particular low noise on the supply lines which may not be guaranteed by the operation of a switched mode voltage regulator. FIG. 6, shows an analog-to digital converter (ADC) 620 which may use internal and/or external reference and supply voltages and may receive an input signal on lines ADCin+ and ADCin−. Whenever, a program uses the ADC, the buck regulator 180 can be deactivated per programming of the respective special function register 160 and the linear voltage regulator can be switched on. Thus, "clean" or "cleaner" supply and reference voltages can be provided during the ADC conversion. Once the conversion is finished, the buck regulator 180 can be turned on again.

One or more controlling special function registers 160 and/or configuration registers 161 may be used to control the operation of the linear voltage regulator 510 and the buck regulator 180. For example, such registers may determine the output voltage of the linear voltage regulator 510 and/or the buck regulator 180. Also certain trimming functions may be performed by such registers. In some embodiment, the special function register 160 can select between the use of the linear and the buck regulator. However, other embodiments may determine the selection automatically dependent on the activation and/or stable operation of the buck regulator 180 as will be explained in more detail below with reference to FIG. 7. generally, special function register 160 are volatile whereas configuration registers 161 are non-volatile. However, according to other embodiments, certain special function registers 160 and/or configuration registers 161 can be non-volatile or a fuse can be used, for example to set a trimming or to select which one of the two regulators is to be used permanently. Thus, for minimum power consumption in certain applications, the internal LDO voltage regulator can be always switched off. In another configuration, the linear voltage regulator 510 is always used until the buck regulator 180 is operational and then the linear regulator 510 is switched off. In yet other embodiment, a user can dynamically switch between the two regulators. Registers 160, 161 can therefore be used to set such functionality.

Instead of switching between the two regulators by turning one regulator on and the other one off, the linear voltage regulator may be deactivated automatically as will be explained below in more detail. FIG. 6 shows yet another embodiment in which the LDO voltage regulator 510 is again the default regulator. Here, the buck regulator 180 is designed to generate a slightly higher output voltage which however is still within the specification range. For example, according to an embodiment, the buck regulator may output a voltage that is 100 mV higher than the output voltage of the linear voltage regulator. Special function register 160 is here used to activate the buck regulator 180 but not to turn on/off the linear regulator 510. However, other special function registers 160 may be used to control certain functions of the linear and/or buck regulator. Once activated and fully operational, the buck regulator 180 will generate the slightly higher output voltage than the LDO voltage regulator 510. Comparator 610 is provided which compares this output voltage with a reference value. If comparator 610 detects that a slightly higher voltage is present as the internal core voltage, it recognizes that the buck regulator has been activated and is fully functional. Thus, comparator 610 will automatically generate a signal to shut down LDO voltage regulator 510 as indicated in FIG. 6 with the control line between comparator 610 and LDO voltage regulator 510.

According to another embodiment, comparator 610 is a set-point regulator within the linear voltage regulator 510. Because this set point is slightly lower that the output voltage of the buck regulator 180, this will cause the linear regulator to not supply any current which effectively automatically turns off the linear voltage regulator 510. Such a combination also automatically turns off the linear regulator only if the switched mode voltage regulator is fully operational. If the buck regulator is turned off by means of a special function register, for example by setting a respective control bit, the output voltage of the buck regulator 180 will drop below this threshold and the linear voltage regulator will automatically be turned on again to regulate the voltage. This specific embodiment ensures that there is no glitch when switching between the two regulators. A microprocessor will therefore "not notice the difference", in other words no power flow interruption, brown out or voltage drop will occur by the transition between the two regulators.

An integrated device having both, the standard LDO voltage regulator 510 and the buck regulator 180 as shown in the embodiments of FIGS. 5 and 6 is also beneficial for other reasons. A manufacturer only needs to produce one type of microcontroller which optionally can operate with either the LDO voltage regulator 510 or the buck regulator 180. No external pins are wasted when the additional external pins are multiplexed with other functions as common in many microcontroller devices. Moreover, the feedback pin 140*d* can be used for both the LDO voltage regulator and the buck regulator because the LDO voltage regulator 510 in most embodiments will also require an external capacitor. Thus, only pin 140*c* may optionally, in particular for low pin count microcontrollers, require a multiplexing with other functions.

Figure 7:
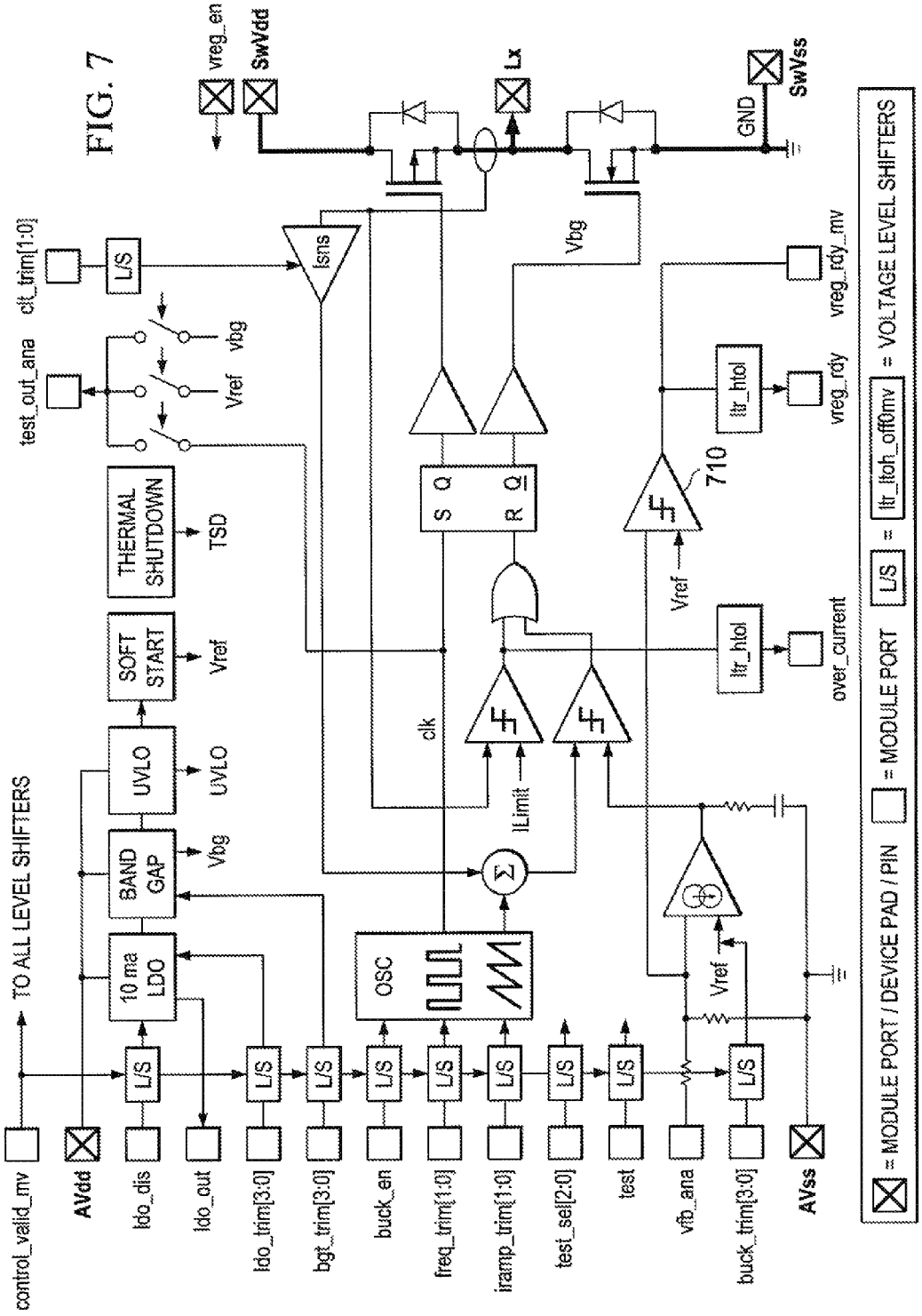
FIG. 7 shows a more detailed block diagram of the arrangement shown in FIG. 6.

FIG. 7 shows a more detailed block diagram of the circuits within a microcontroller that are relevant according to the embodiment shown in FIG. 6. In this embodiment the supply voltage for the buck regulator is referenced as SwVdd and SwVss. A separate external supply is referenced as AVdd and AVss. This can be an analog or digital supply voltage which supplies certain modules of the integrated circuit device, for example the linear voltage regulator LDO which is capable in this embodiment of delivering 10 mA, the bandgap and under-voltage lock out module. This option to separate the supply voltage for the buck regulator may be beneficial due to the noise that is produced by the buck regulator on these supply lines. However, if this is of no concern or any of the above explained methods is implemented, then these lines can be connected to a pair of single supply lines. The comparator for determining the output voltage of the buck regulator is referenced with numeral 710 and generates output control signals vreg_rdy. Again this comparator 710 can be advantageously the set-point comparator of the linear voltage regulator LDO. In addition, FIG. 7 shows amongst others the following internal control lines: Ido_trim[3:0], bgt_trim[3:0], freq_trim[1:0], iramp_trim[1:0], and buck_trim[3:0]. These lines refer to trimming functionality as mentioned above of, for example, the linear regulator LDO, the bandgap circuit, the oscillator OSC for generating the pulse and ramp signals, and the buck regulator. In the embodiment shown, some trimming functions use 4 bits and others only 2 bits. The bit resolution of these trimming functions depends obviously on the implementation and specific requirement.

Figure 8:
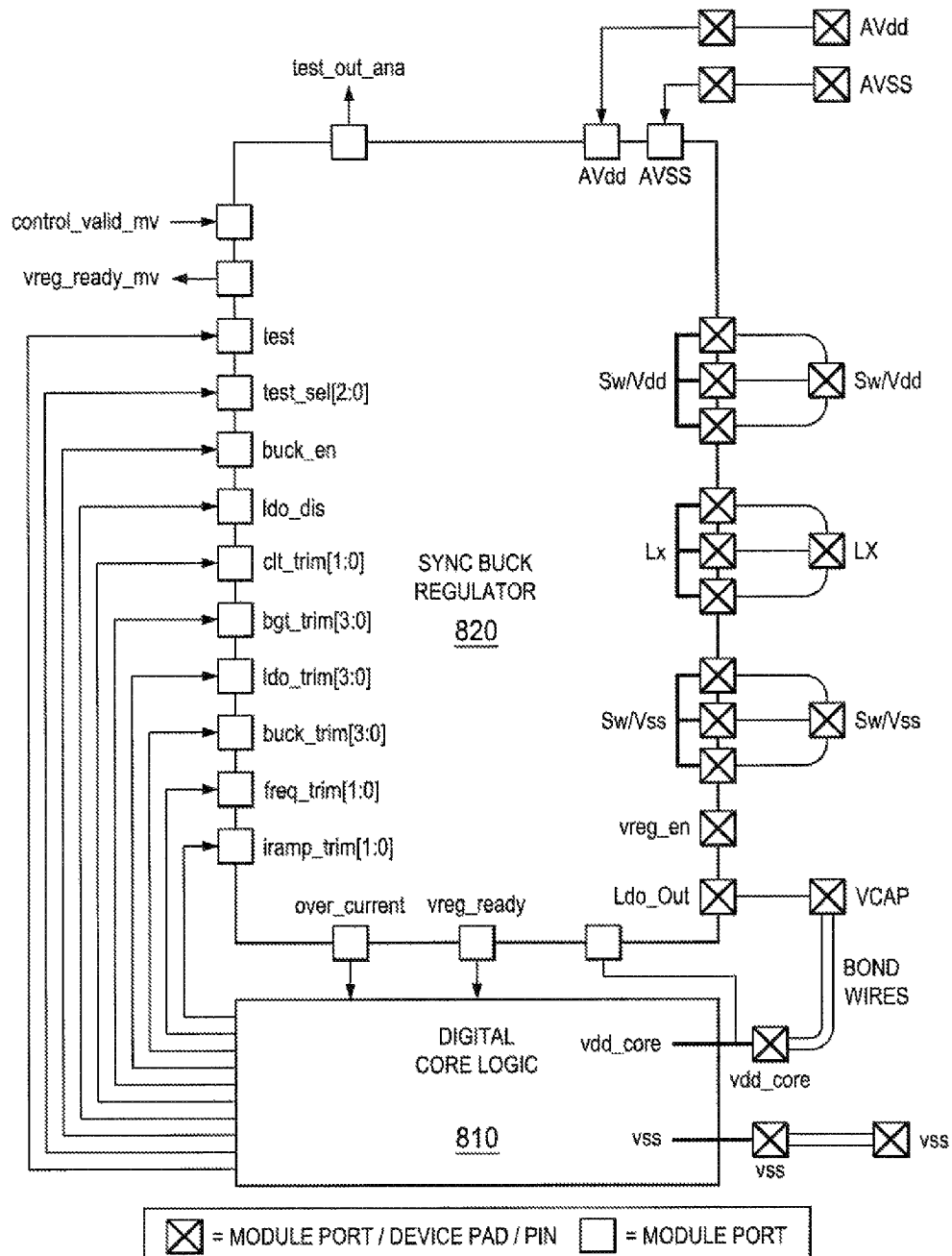
FIG. 8 shows a block diagram of a digital control logic combined with the embodiment shown in FIG. 7.

FIG. 8 shows digital logic 810 coupled with the circuit 820 which corresponds to the circuit shown in FIG. 7. Even shown as separate boxes, these circuits are all implemented on a single chip together with the microcontroller (not shown in FIG. 8). External pins are shown on the right side. Again, this embodiment has the option of separate supply lines AVdd, AVss and SwVdd and SwVss. The core voltage vdd_core is connected to the feedback input VCAP which again is also connected to the low drop out voltage regulator output as shown in FIG. 6.

The invention, therefore, is well adapted to carry out the objects and attain the ends and advantages mentioned, as well as others inherent therein. While the invention has been depicted, described, and is defined by reference to particular preferred embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An integrated circuit device comprising:
a digital device operating at an internal core voltage;
a linear voltage regulator;
an internal switched mode voltage regulator controlled by said digital device and receiving an external supply voltage being higher than said internal core voltage through at least first and second external pins and generating said internal core voltage, wherein said internal switched mode voltage regulator is coupled with at least one external component through at least one further external pin, wherein the switched mode voltage regulator generates a higher output voltage than the linear voltage regulator, and
a comparator that automatically turns off the linear voltage regulator once the higher output voltage has been detected.

2. The integrated circuit device according to claim 1, wherein the external component comprises an inductor.

3. The integrated circuit device according to claim 1, wherein the external component comprises an inductor and a capacitor, wherein the inductor is coupled between a third and fourth external pin and said capacitor is coupled between the fourth external pin and ground.

4. The integrated circuit device according to claim 3, wherein the internal switched mode voltage regulator is a buck regulator.

5. The integrated circuit device according to claim 1, wherein the digital device is a microcontroller.

6. The integrated circuit device according to claim 5, wherein the microcontroller comprises a low power function.

7. The integrated circuit device according to claim 1, wherein the digital device is selected from the group consisting of: a microprocessor, a state machine, an application specific integrated circuit (ASIC), and a logic device.

8. The integrated circuit device according to claim 1, wherein an output of the switched mode voltage regulator and the linear voltage regulator are connected.

9. The integrated circuit device according to claim 1, wherein the comparator is a set point comparator of the linear voltage regulator.

10. The integrated circuit device according to claim 1, wherein the linear voltage regulator is the default voltage regulator and further comprising a configuration register for activating said switched mode voltage regulator.

11. The integrated circuit device according to claim 1, further comprising a power management unit operable to enable or disable at least one of said switched mode voltage regulator and said linear voltage regulator.

12. The integrated circuit device according to claim 1, wherein the external supply voltage is about 3.3 Volts and the internal core voltage is about 1.8 Volts.

13. A circuit board comprising the integrated circuit device according to claim 1 and a plurality of further integrated circuit devices operating at the external supply voltage, wherein said circuit board provides said external supply voltage as the only power supply voltage to said integrated circuit.

14. A microcontroller formed in an integrated circuit device, comprising:
a central processing core operating at an internal core voltage;
a plurality of peripheral devices;
a linear voltage regulator;
an internal switched mode voltage regulator controlled by said central processing core and receiving an external supply voltage being higher than said internal core voltage through at least first and second external pins and generating said internal core voltage, wherein said internal switched mode voltage regulator is coupled with at least one external component through at least one further external pin, wherein the at least one further external pin is multiplexed with one a function provided by of the plurality of peripheral devices wherein the switched mode voltage regulator generates a higher output voltage than the linear voltage regulator, and a comparator that automatically turns off the linear voltage regulator once the higher output voltage has been detected.

15. A method of operating an integrated circuit device, comprising:
providing a supply voltage;
providing an integrated circuit device operating at an internal core voltage being lower than the external supply voltage;
feeding the supply voltage to said integrated circuit;
generating the internal core voltage within said integrated circuit device by means of a linear voltage regulator;
programming a switched mode voltage regulator within the integrated circuit device to operate, wherein the switched mode voltage regulator being connected to at least one external component via at least one external connection pin, wherein the switched mode voltage regulator generates a higher output voltage than the linear voltage regulator;
comparing the output voltage of the switched mode voltage regulator with a reference value and switching from said linear voltage regulator to said switched mode voltage regulator for generating the internal core voltage if the output voltage of the switched mode voltage regulator is higher than the output voltage of the linear regulator and turning off said linear voltage regulator.

16. The method according to claim 15, wherein the step of comparing is performed by a set point comparator of the linear voltage regulator.

17. The method according to claim 15, wherein the linear voltage regulator is the default voltage regulator and the step of programming comprises writing a configuration value into a configuration register or a control value into a control register.

18. The method according to claim 15, further comprising enabling or disabling at least one of said switched mode voltage regulator and said linear voltage regulator.

19. The method according to claim 15, wherein the integrated circuit device is a microcontroller.

20. The method according to claim 19, further comprising multiplexing the at least one further external pin with other microcontroller functions.

21. The method according to claim 15, further comprising:
switching back to said linear voltage regulator for generating the internal core voltage and turning off said switched mode voltage regulator;
performing a function of the integrated circuit device;
after performing said function switching back from said linear voltage regulator to said switched mode voltage regulator.

22. The method according to claim 21, wherein said integrated circuit device is a microcontroller and said function is an analog-to-digital conversion function.

23. The method according to claim 21, wherein said integrated circuit device is a microcontroller and said function is a low power mode function.

24. The method according to claim 23, further comprising:
switching from said linear voltage regulator to said switched mode voltage regulator or vice versa for generating the internal core voltage.

25. The method according to claim 24, wherein the switched mode voltage regulator generates a higher output voltage than the linear voltage regulator and the step of switching comprises comparing the output voltage of the switched mode voltage regulator with a reference value.

26. The method according to claim 25, wherein the step of comparing is performed by a set point comparator of the linear voltage regulator.

27. A method of operating an integrated circuit device, comprising:
providing a supply voltage;
providing an integrated circuit device operating at an internal core voltage being lower than the supply voltage;
feeding the supply voltage to said integrated circuit;
selecting the internal core voltage from either a linear voltage regulator providing an output voltage or a switched mode voltage regulator according to a preset configuration, wherein the switched mode voltage regulator providing a higher output voltage than the linear voltage regulator is connected to at least one external component via at least one external connection pin, wherein said preset configuration is determined by setting or clearing at least one bit in a control register;
generating the internal core voltage within said integrated circuit device by means of the selected voltage regulator and turning off the linear voltage regulator once a comparator detects the higher output voltage.

28. The method according to claim 27, further comprising enabling or disabling at least one of said switched mode voltage regulator and said linear voltage regulator.

29. The method according to claim 27, wherein the integrated circuit device is a microcontroller.

30. The method according to claim 29, further comprising multiplexing the at least one further external pin with other microcontroller functions.

31. The method according to claim 27, further comprising:
switching to said linear voltage regulator for generating the internal core voltage and turning off said switched mode voltage regulator;
performing a function of the integrated circuit device;
after performing said function switching back from said linear voltage regulator to said switched mode voltage regulator.

32. The method according to claim 31, wherein said integrated circuit device is a microcontroller and said function is an analog-to-digital conversion function.

33. The method according to claim 31, wherein said integrated circuit device is a microcontroller and said function is a low power mode function.

* * * * *

UNITED STATES PATENT AND TRADEMARK OFFICE
CERTIFICATE OF CORRECTION

PATENT NO.        : 8,779,734 B2  
APPLICATION NO.   : 13/313296  
DATED             : July 15, 2014  
INVENTOR(S)       : Bryan Kris et al.

Page 1 of 1

It is certified that error appears in the above-identified patent and that said Letters Patent is hereby corrected as shown below:

In the Claims

Column 13,
Claim 27, lines 27-30 "...switched mode voltage regulator according to a preset configuration, wherein the switched mode voltage regulator providing a higher output voltage than the linear voltage regulator..." ---Change to--- "...switched mode voltage regulator providing a higher output voltage than the linear voltage regulator according to a preset configuration, wherein the switched mode voltage regulator..."

Signed and Sealed this
Thirtieth Day of September, 2014

Michelle K. Lee
*Deputy Director of the United States Patent and Trademark Office*